United States Patent
Fuller et al.

[11] Patent Number: 6,068,941
[45] Date of Patent: May 30, 2000

[54] START UP OF COLD FUEL CELL

[75] Inventors: Thomas F. Fuller, Glastonbury; Douglas J. Wheeler, Tolland, both of Conn.

[73] Assignee: International Fuel Cells, LLC, South Windsor, Conn.

[21] Appl. No.: 09/177,331

[22] Filed: Oct. 22, 1998

[51] Int. Cl.[7] .................................................. H01M 8/00
[52] U.S. Cl. .............................. 429/13; 429/14; 429/17; 429/20; 429/24; 429/26; 429/32; 429/34; 429/38; 429/39
[58] Field of Search .............................. 429/13, 26, 38, 429/39, 14, 17, 20, 24, 34, 32

[56] References Cited

U.S. PATENT DOCUMENTS

| | | | |
|---|---|---|---|
| 5,503,944 | 4/1996 | Meyer et al. | 429/13 |
| 5,573,866 | 11/1996 | Van Dine et al. | 429/13 |
| 5,796,186 | 8/1998 | Fletcher et al. | 429/13 |

Primary Examiner—Bruce F. Bell
Attorney, Agent, or Firm—M. P. Williams

[57] ABSTRACT

A proton exchange membrane fuel cell has methanol or ethanol fed into the coolant passages during shut down so as to prevent water trapped therein from freezing in sub-freezing environments. Upon start-up, a controlled amount of air is fed through the cathode reactant flow field so that alcohol diffusing to the cathode catalyst is oxidized, producing heat which will raise the temperature of the fuel cell above freezing, and to a normal operating temperature. A heat exchanger in the coolant water circulating loop may be bypassed during start-up.

9 Claims, 1 Drawing Sheet

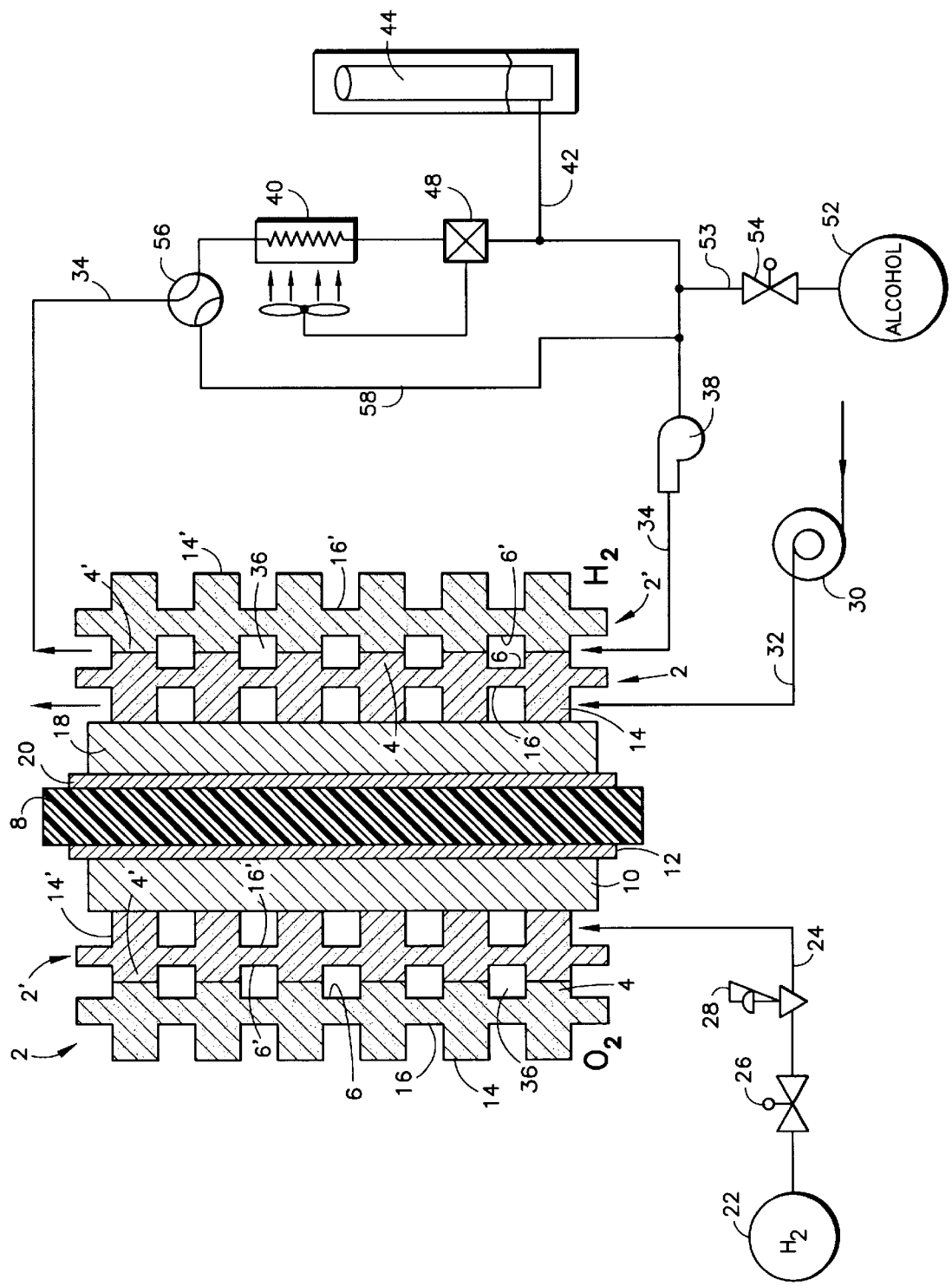

START UP OF COLD FUEL CELL

TECHNICAL FIELD

This invention relates to protecting and starting up a cold fuel cell by the introduction, upon shut-down, of a low molecular weight alcohol into the coolant channel of the fuel cell, and warming the fuel cell, upon start-up, by flowing a controlled amount of air into the normal process oxidant (air) channel on the cathode side of the fuel cell, the methanol diffusing to the cathode catalyst where it reacts with the air to produce heat, thereby to warm the fuel cell to a temperature at which fuel cell operation may begin.

BACKGROUND ART

Several different types of fuel cells are common in the art. In one type, such as phosphoric acid fuel cells and potassium hydroxide fuel cells, the cathode may comprise only hydrophobic layers, and remain unflooded. In another type of fuel cell, referred to as a proton exchange membrane (or PEM) fuel cell, a thin film, flooded electrode consists of a catalyst and a proton exchange resin. Because of its solid electrolyte, the PEM fuel cell has inherent pressure and safety advantages over cells that utilize liquid acid or alkaline electrolytes, for use in some environments, such as in electrically powered vehicles: solid electrolyte is stable, can withstand greater pressure differentials, and does not leach from the cell. However, cell water management is required to keep the anode and the proton exchange membrane wet, and to prevent the cathode from flooding, and thereby blocking the oxidant from reaching the cathode.

When any fuel cell is utilized in an isolated environment, such as in vehicles, it may be subject to extreme winter temperatures, including temperatures well below 0° C. (+32° F.). In fact, it may be as low as −40° C. (−40° F.) whereas the fuel cell may not be stored below about 0° C. (+32° F.) without freezing. It has been known to introduce anti-freeze solutions, such as methanol, into a fuel cell to prevent it from freezing, when not in use, in sub-freezing environments.

DISCLOSURE OF INVENTION

Objects of the invention include starting a PEM fuel cell, the temperature of which is below the normal operating temperature, starting a PEM fuel cell in which at least part of its water is frozen, protecting a PEM fuel cell in a freezing environment, and starting a cold PEM fuel cell without use of external heating means.

According to the present invention, upon shutdown of a PEM fuel cell, a controlled amount of low molecular weight alcohol, such as methanol or ethanol, is fed into the coolant passages so as to protect the fuel cell against freezing, and upon start-up, a controlled amount of oxidant such as air is fed into the cathode reactant (oxidant) flow field; the alcohol diffuses to the cathode catalyst where it is oxidized by the oxygen in the air, thus heating the fuel cell. In accordance with the invention, most of the water may be drained from the fuel cell before adding alcohol to the coolant passages. According further to the invention, the amount of air introduced into the cathode reactant flow field upon start-up is limited so as to prevent an excessive temperature rise which could damage the fuel cell, particularly the proton exchange membrane.

Other objects, features and advantages of the present invention will become more apparent in the light of the following detailed description of exemplary embodiments thereof, as illustrated in the accompanying drawing.

BRIEF DESCRIPTION OF THE DRAWINGS

The sole figure herein is a stylized, schematic diagram of a portion of a fuel cell system utilizing the present invention.

BEST MODE FOR CARRYING OUT THE INVENTION

An exemplary PEM fuel cell in which the present invention may be practiced is shown in U.S. Pat. No. 5,503,944. As is known, a fuel cell system or power plant is comprised of many fuel cells disposed adjacent to each other so as to form a stack. Referring to the figure, each component cell will include a membrane 8; an anode substrate 10, and an anode catalyst layer 12; a cathode substrate 18, and a cathode catalyst layer 20; an anode flow field plate 2'; and a cathode flow field plate 2. The flow field plates 2 and 2' are positioned back-to-back with the projections 4 and 4' being disposed in face-to-face contact. The grooves 6 and 6' combine to form coolant water flow fields on the anode and cathode sides of the electrolyte membrane 8. The projections 14' abut the anode substrate 10; and the projections 14 abut the cathode substrate 18. The grooves 16' thus form the anode reactant flow field; and the grooves 16 form the cathode reactant flow field.

The figure also shows, schematically, the system components of the fuel cell stack power plant. All of the anode reactant flow fields 16' in the power plant are supplied with a hydrogen-rich fuel gas reactant from a supply source tank 22 thereof. The supply source could also be any suitable fuel processor, such as an auto-thermal reformer, for converting an organic fuel to hydrogen. The hydrogen reactant flows from the supply source 22 to the anode flow fields 16' through a supply line 24. The amount and pressure of hydrogen-rich fuel flowing through the supply line 24 is controlled by a supply valve 26 and a supply regulator 28 which may be manually or automatically operated. The anode flow fields 16' are vented in a conventional way (not shown). All of the cathode flow fields 16 are supplied with ambient oxidant such as air via an air blower 30 and an air line 32. The oxygen used in the electrochemical reaction is thus derived from ambient air in this embodiment.

Coolant water is circulated through the power plant cell units via lines 34. The coolant water passes through coolant passages 36 between the plates 2 and 2'. Coolant water is circulated by a pump 38, which can be a fixed or variable speed pump. The coolant water circulating loop includes a heat exchanger 40 which lowers the temperature of the water exiting from the coolant passages 36. A branch line 42 leads from the line 34 to a reservoir 44 that is open to ambient surroundings. Excess water formed by the electrochemical reaction, i.e., product water, is bled into the reservoir 44 by way of the line 42. Thus the reservoir 44 provides a recipient of system product water. The heat exchanger will preferably be controlled by a thermostat 48 which senses the temperature of the water stream exiting the heat exchanger 40.

In accordance with the invention, a low molecular weight alcohol, such as methanol or ethanol is provided upon shut-down by a supply tank 52 via a supply line 53 under control of a supply valve 54, to the inlet of the coolant water pump 38. The valve 54 is open during shut-down of the fuel cell, preferably after any excess water is drained therefrom through drains located so as to remove as much water as possible from the cells themselves. The amount of alcohol which will be used is dependent upon the design features of the fuel cell. To assure that the cell will not freeze at −40° C. (−40° F.), an aqueous mixture of about 41 weight percent of methanol or 54 weight percent of ethanol is required.

Upon start-up, a two-way valve 56 is rotated clockwise from the position shown in which cooling water is fed from the line 34 to the heat exchanger 40, into a position in which the coolant water is fed from the line 34 through a bypass line 58 to the inlet of the water pump 38, thus bypassing the heat exchanger 40 so as to assist in warming of the fuel cell. In the start-up sequence, the air blower 30 and water pump 38 are operated off an auxiliary power source, such as a battery. The blower 30 is operated so as to provide a limited flow of air so that the rate of oxidation of the methanol is sufficiently low as to not raise the temperature of the cells to that at which damage could occur. If desired, flow regulating means may be provided within the air line 32 so as to provide additional control of the air flow. If desired, this may be operated closed-loop in response to temperature within the cells, in a conventional fashion. As the alcohol and air react at the normal cathode catalyst layer 20, the energy produced raises the temperature of the cell, and the coolant. As the temperature of the cell reaches approximately 65° C. (150° F.), the two-way valve 56 may be rotated counter-clockwise so that the cooling water flows from the line 34 through the heat exchanger 40, which prevents overheating of the cell as air and coolant continue to flow until all of the alcohol is oxidized. At that point, the valve 26 may be opened so as to flow hydrogen through the anode, and the normal operating quantity of air may be flowed from the air compressor 30, to provide normal fuel cell operation.

The aforementioned patent is incorporated herein by reference.

Thus, although the invention has been shown and described with respect to exemplary embodiments thereof, it should be understood by those skilled in the art that the foregoing and various other changes, omissions and additions may be made therein and thereto, without departing from the spirit and scope of the invention.

We claim:

1. A fuel cell system comprising:

a stack of fuel cells, each fuel cell comprising a proton exchange membrane, a cathode catalyst and an anode catalyst disposed on opposing sides of said membrane, and coolant water flow fields adjacent to at least one of the anode and cathode sides of each of said membranes;

an oxidant supply means for providing oxidant to the cathode;

a coolant water circulating loop including a pump;

characterized by the improvement comprising:

a source of low molecular weight alcohol for providing to said coolant water circulating loop a sufficient quantity of alcohol to prevent water in said fuel cell system from freezing at a predetermined temperature, said source of alcohol being controllable to provide alcohol to said loop upon shut-down of said fuel cell; and said oxidant supply means operable to provide, upon start-up, a controlled flow of oxidant through said cathode reactant flow field, whereby alcohol diffusing from said water circulating loop to said cathode catalyst is oxidized, producing heat which warms said fuel cell.

2. A fuel cell system according to claim 1 further comprising:

a heat exchanger interconnected within said coolant water circulating loop for lowering the temperature of the water in said loop; and a heat exchanger bypass loop for bypassing coolant water around said heat exchanger during start-up of said fuel cell system.

3. A fuel cell system according to claim 1 wherein said predetermined temperature is −40° C. (−40° F.).

4. A fuel cell system according to claim 1 wherein said alcohol is methanol or ethanol.

5. A method of operating a proton exchange membrane fuel cell system having a cathode catalyst and a cathode reactant flow field, and having a coolant water circulating loop, comprising:

(a) upon shut-down of the fuel cell, introducing a low molecular weight alcohol into said coolant water circulating loop; and (b) at the beginning of a start-up sequence, introducing a limited flow of oxidant into said cathode reactant flow field to combust the methanol, thereby generating heat, whereby to raise the fuel cell temperature.

6. A method according to claim 5, further comprising before said step (a):

draining a significant fraction of the water from said fuel cell.

7. A method according to claim 5 wherein said coolant water circulating loop includes a heat exchanger; and further comprising:

before said step (b), bypassing said circulating coolant water around said heat exchanger.

8. A method according to claim 7 further comprising:

after said step (b), when the coolant water reaches fuel cell operating temperature, passing at least a portion of said circulating coolant water through said heat exchanger.

9. A method according to claim 5 wherein said alcohol is methanol or ethanol.

\* \* \* \* \*